United States Patent
Underwood (10) Patent No.: US 7,406,084 B2
(45) Date of Patent: Jul. 29, 2008

(54) FLEXIBLE SOFTWARE ARCHITECTURE FOR A CALL PROCESSING SYSTEM

(75) Inventor: Derek J. Underwood, Boca Raton, FL (US)

(73) Assignee: Nokia Siemens Networks GmbH & Co. KG, Munich (DE)

(*) Notice: Subject to any disclaimer, the term of this patent is extended or adjusted under 35 U.S.C. 154(b) by 1106 days.

(21) Appl. No.: 10/178,693

(22) Filed: Jun. 17, 2002

(65) Prior Publication Data
US 2003/0016675 A1 Jan. 23, 2003

Related U.S. Application Data

(63) Continuation of application No. 08/934,250, filed on Sep. 19, 1997, now abandoned.

(51) Int. Cl.
*H04L 12/28* (2006.01)

(52) U.S. Cl. .............. 370/395.1; 370/404; 370/468

(58) Field of Classification Search .............. 370/222, 370/223, 373, 395.1, 395.2, 395.41, 395.51, 370/389.61, 396, 397, 400, 437, 539, 907, 370/468, 395.61

See application file for complete search history.

(56) References Cited

U.S. PATENT DOCUMENTS

| | | | | | |
|---|---|---|---|---|---|
| 4,965,790 | A | * | 10/1990 | Nishino et al. | 370/437 |
| 5,029,164 | A | * | 7/1991 | Goldstein et al. | 370/235 |
| 5,495,484 | A | * | 2/1996 | Self et al. | 370/338 |
| 5,708,697 | A | * | 1/1998 | Fischer et al. | 379/88.01 |
| 6,137,800 | A | * | 10/2000 | Wiley et al. | 370/395.51 |
| 6,181,703 | B1 | * | 1/2001 | Christie et al. | 370/410 |

* cited by examiner

Primary Examiner—Chi H. Pham
Assistant Examiner—Alexander Boakye
(74) Attorney, Agent, or Firm—Bell, Boyd & Lloyd LLP (57) ABSTRACT

A telephone switching network having a plurality of nodes interconnected through the network through channels having dynamically changeable capacity. The telephone switching network includes a plurality of switching nodes and a network manager responsive to each one of the nodes for allocating traffic capacity of the network among the nodes dynamically in accordance with the traffic requested at the plurality of nodes. Each one of the nodes is coupled to the network through an ATM ADM. Each one of the ATM ADMs is coupled to a narrowband switch through an ATM switch. The nodes are interconnected through an ATM SONET.

10 Claims, 10 Drawing Sheets

| LINES SUBTENDING ATM RING | TRUNKS REQUIRED ON RING | EQUIVALENT TRUNK BANDWIDTH (SUM OF ALL VPS) | MINIMUM RATE FOR 4-FIBER BLSR (MESHED TRAFFIC) | MINIMUM RATE FOR 4-FIBER BLSR (HUBBED TRAFFIC) |
|---|---|---|---|---|
| 125,000 | 14,000 | 1Gb/s | OC-12/STM-4 | OC-12/STM-4 |
| 250,000 | 28,000 | 2Gb/s | OC-12/STM-4 | OC-48/STM-16 |
| 500,000 | 56,000 | 4Gb/s | OC-48/STM-16 | OC-48/STM-16 |
| 1,000,000 | 112,000 | 8Gb/s | OC-48/STM-16 | OC-192/STM-64 |
| 2,000,000 | 224,000 | 16Gb/s | OC-192/STM-64 | OC-192/STM-64 |

FLEXIBLE SOFTWARE ARCHITECTURE FOR A CALL PROCESSING SYSTEM

This is a continuation, divisional, of application Ser. No. 08/934,250 filed Sep. 19, 1997 now abandoned

BACKGROUND OF THE INVENTION

This invention relates generally to telephone switching networks.

Figure 1:
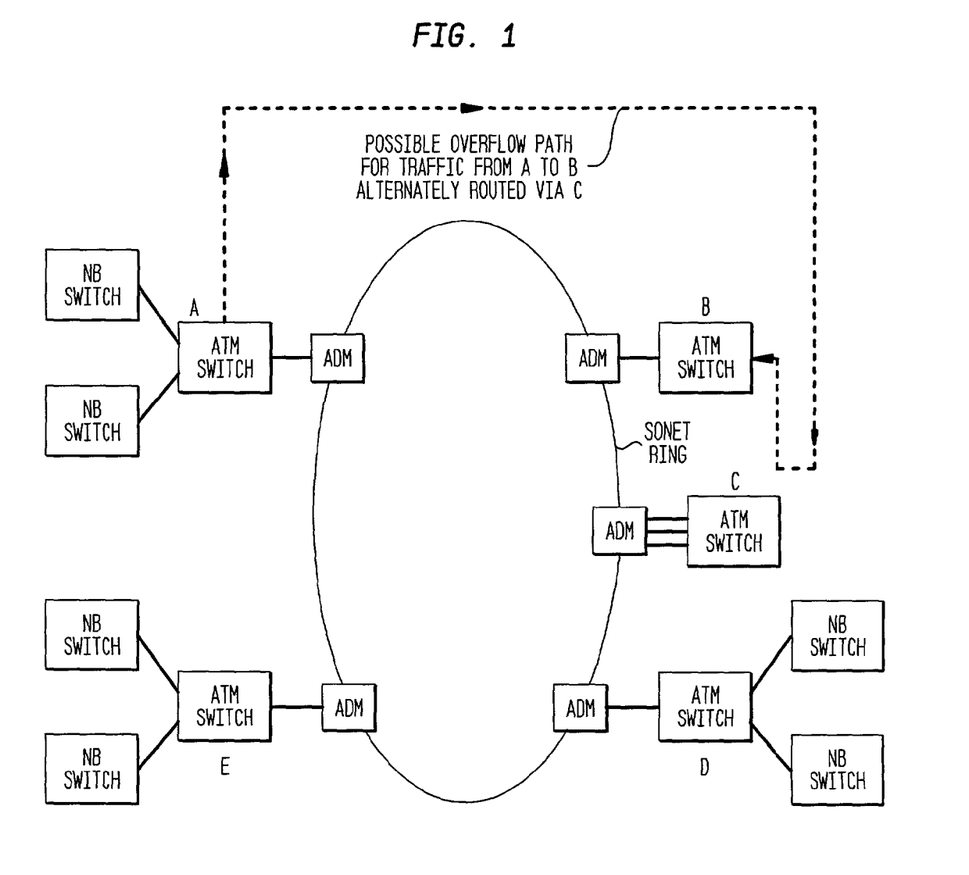
FIG. 1 is a diagram of a telephone switching network according to the PRIOR ART.

As is known in the art, narrowband metropolitan and regional public telephone switching networks are typically based on the interconnection of local end office switches via tandems in a hierarchical arrangement, or when required by the volume of traffic, via direct trunk groups. National telephone switching networks usually use a mesh topology to interconnect regionally located tandems in a non-hierarchal, or mesh switching network. One such mesh switching network suggested is an ATM mesh switching network used with a Synchronous Optical Network (SONET) ring, as shown in FIG. 1. Here, for example, nodes A through E serve a plurality of narrowband (NB) switches, the NB switches at each node being here arranged in a hierarchial architecture. Each hierarchial structure of NB switches terminates in an ATM switch at the node, as shown. It is noted that with N nodes, there are $N(N-1)/2$ paths which are possible between the nodes. For example, with the 5 node arrangement shown in FIG. 1, there are 10 possible paths between the various nodes (i.e., paths between nodes A and B, A and C, A and D, A and D, A and E, B and C, B and D, B and E, C and D, and D and E). It is noted that there may be up to 16 nodes on the ring, resulting in 120 paths.

Each ATM switch is coupled to the SONET ring through an add-drop multiplexer (ADM). Each ADM takes traffic on the ring and drops it off to the ATM switch coupled thereto (i.e., its associated ATM switch) or takes traffic from the associated ATM switch and couples it onto the ring.

The total capacity of the SONET ring is fixed, for example, 2.5 gigabits/second (Gb/s). The total ring capacity must be distributed among the paths, here among the 10 paths. This distribution is established by traffic engineering (i.e., estimating the expected traffic distribution among the paths) and once established, implemented by pre-setting, or pre-conditioning, the ADMs. For example, if the ADM at node B were pre-set at 480 channels between nodes A and B and all 480 channels are in use, a new call being made at node A for node B, would not be able to be routed directly from node A to node B. Rather, assuming in this example that the capacity between nodes A and C where not totally used and the capacity between channel B and C were not totally used, the new call may be routed from the ATM switch and the ADM at node A, then to the ADM at node B, then to the ADM and ATM switch at node C, and finally to the ADM and ATM switch at node B. Thus, the traffic flows on the ring twice, i.e., between nodes B and C and then from Node C to node B, thereby reducing the efficiency switching network, as indicated by the dotted arrow in FIG. 1.

As is also known in the art, an ADM can operate in the Time Division Multiplexing (TDM) mode or the ATM mode. While ADMs today operate in a TDM mode, the use of an ATM ADM has been suggested to increase SONET utilization efficiency by using virtual paths as the traffic entities which are added or dropped to or from the SONET ring instead of using fixed bandwidth virtual tributaries. With such suggested arrangement, a virtual path may have any bandwidth up to the SONET ring line rate limit. Such an arrangement is described in Bellcore GR-2837-CORE Issue 2, "ATM Virtual Path Functionality in SONET Rings" published December 1995, the entire subject matter thereof being incorporated herein by reference.

As is also known in the art, two distinct methods can be used for interworking narrowband traffic into an ATM network: network interworking, which is also known as landline interworking; and, service interworking. Service interworking envisions the ATM network as a full-service B-ISDN while network interworking simply uses the ATM network as a more bandwidth-efficient transport network. Service interworking involves mapping of narrowband services and signalling into a native ATM environment (e.g., B-ISUP signalling). Network interworking, as used herein, provides transparent transport of narrowband services and signaling between narrowband switches through an ATM network.

SUMMARY OF THE INVENTION

In accordance with the present invention, a telephone switching network is provided wherein a plurality of nodes are interconnected to the network through channels having dynamically changeable capacity.

In accordance with another feature of the invention, the telephone switching network includes a plurality of switching nodes and a network manager responsive to each one of the nodes for allocating traffic capacity of the network among the nodes dynamically in accordance with the traffic requested at the plurality of nodes.

In accordance with another feature of the invention, each one of the nodes is coupled to the network through an ATM ADM.

In accordance with another feature of the invention, each one of the ATM ADMs is coupled to a narrowband switch through an ATM switch.

In accordance with another feature of the invention, the nodes are interconnected through an ATM SONET.

BRIEF DESCRIPTION OF THE DRAWING

Other features of the invention, as well as the invention itself, will become more readily apparent from the following detailed description taken together with the accompanying drawings, in which.

DESCRIPTION OF THE PREFERRED EMBODIMENTS

Figure 2:
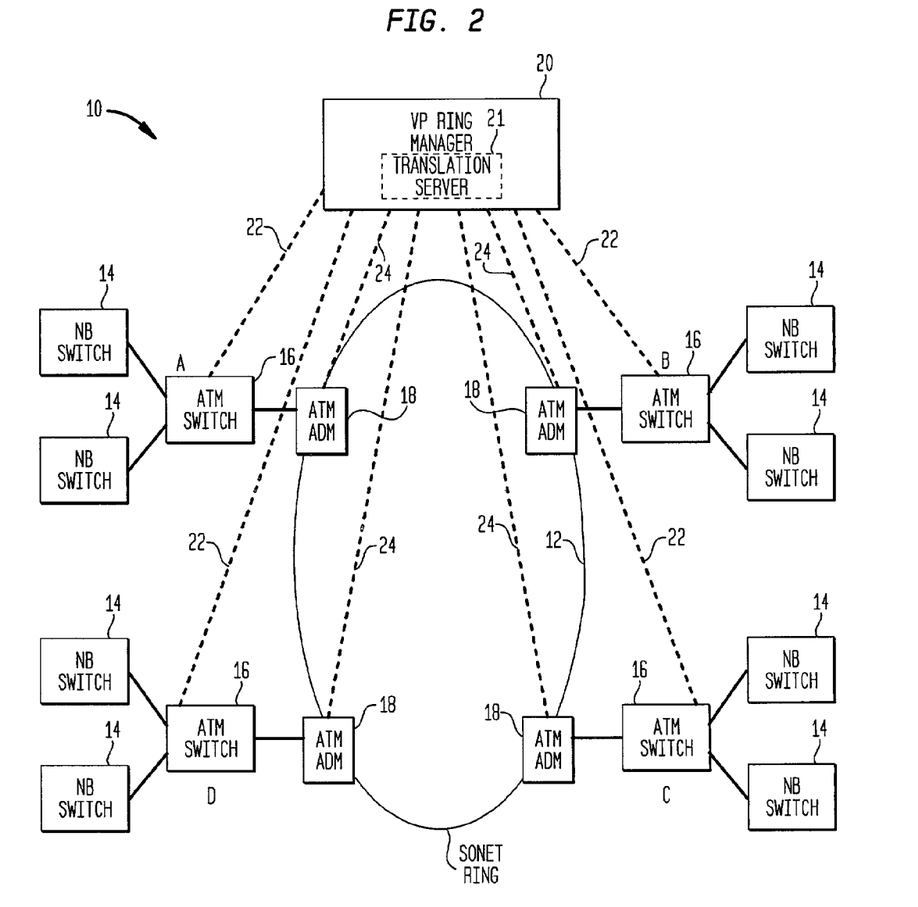
FIG. 2 is a diagram of a telephone switching network according to the invention.

Referring now to FIG. 2, a telephone switching network 10 is shown wherein a plurality of, here four nodes A, B, C, and D are interconnected through the network 10 through channels having dynamically changeable capacity (i.e., bandwidth). Here, the switching network 10 includes a SONET bi-directional ring 12 (i.e., Bi-directional Line Switched Ring, BLSR) which operates in an asynchronous transfer mode (ATM). Each one of the node A-D includes one or a plurality of narrowband (NB) switches 14, e.g., end offices, configured in a hierarchial configuration wherein all the narrowband (NB) switches 14 are connected to a common ATM switch 16 at its associated node. Each one of the ATM switches 16 is coupled to the ring 12 through an ATM ADM 18, as shown. The switching network 10 includes a virtual path (VP) ring manager 20 as shown. The VP ring manager 20 communicates with the ATM switch 16 and ATM ADM 18 at each of the nodes A-D as indicated by the dotted lines 22, 24, respectively. ATM ADMs are described in aforementioned Bellcore GR-2837-CORE Issue 2, "ATM Virtual Path Functionality in SONET Rings" published December 1995, the entire subject matter thereof being incorporated herein by reference. The ATM ring 12 using the ATM ADMs 18 work on a virtual path basis within a designated Synchronous Transfer Mode (STM) concatenated payload, e.g. STS-12c, as described in the above referenced-publication. This allows for finely tuned bandwidth allocation, i.e., traffic capacity, on the ring. The VP ring manager 20 establishes, releases and modifies virtual path connections (VPCs) between ingress and egress points, i.e., nodes A-D, on the ring 12 to create and adjust (i.e., resize) trunk groups dynamically, i.e., on demand by the actual traffic conditions. Thus, the switching network 10 results in a logical mesh in which the bandwidth, and even the existence of inter-nodal links, is dynamically changing. As with the STM-based mesh described in connection with FIG. 1, switching is distributed through the network 10, i.e., around the ring 12, giving the ATM network 10 a high call processing capacity. Here, however, by replacing alternate routing that is used in an STM-based mesh described above in connection with FIG. 1 with dynamic VPC bandwidth management under the control of the VP ring manager 20, transmission facilities can be used with maximum efficiency. Thus, in effect, the bandwidth-on-demand attribute of ATM is exploited to provide dynamic trunking such that no trunk group need to be defined ahead of time. Instead, only when a trunk group is required need a virtual path be established by the VP ring manager 20 and subsequently, only as trunks are needed to carry traffic are virtual circuits setup. In this way, the capacity of a given traffic flow between two nodes, can be expanded, (i.e., increased), or contracted by the VP ring manager 20, in response to the actual traffic demand and available bandwidth, (i.e., capacity) and is not limited by a pre-set, pre-conditioned, or pre-engineered number of trunks.

Figure 3:
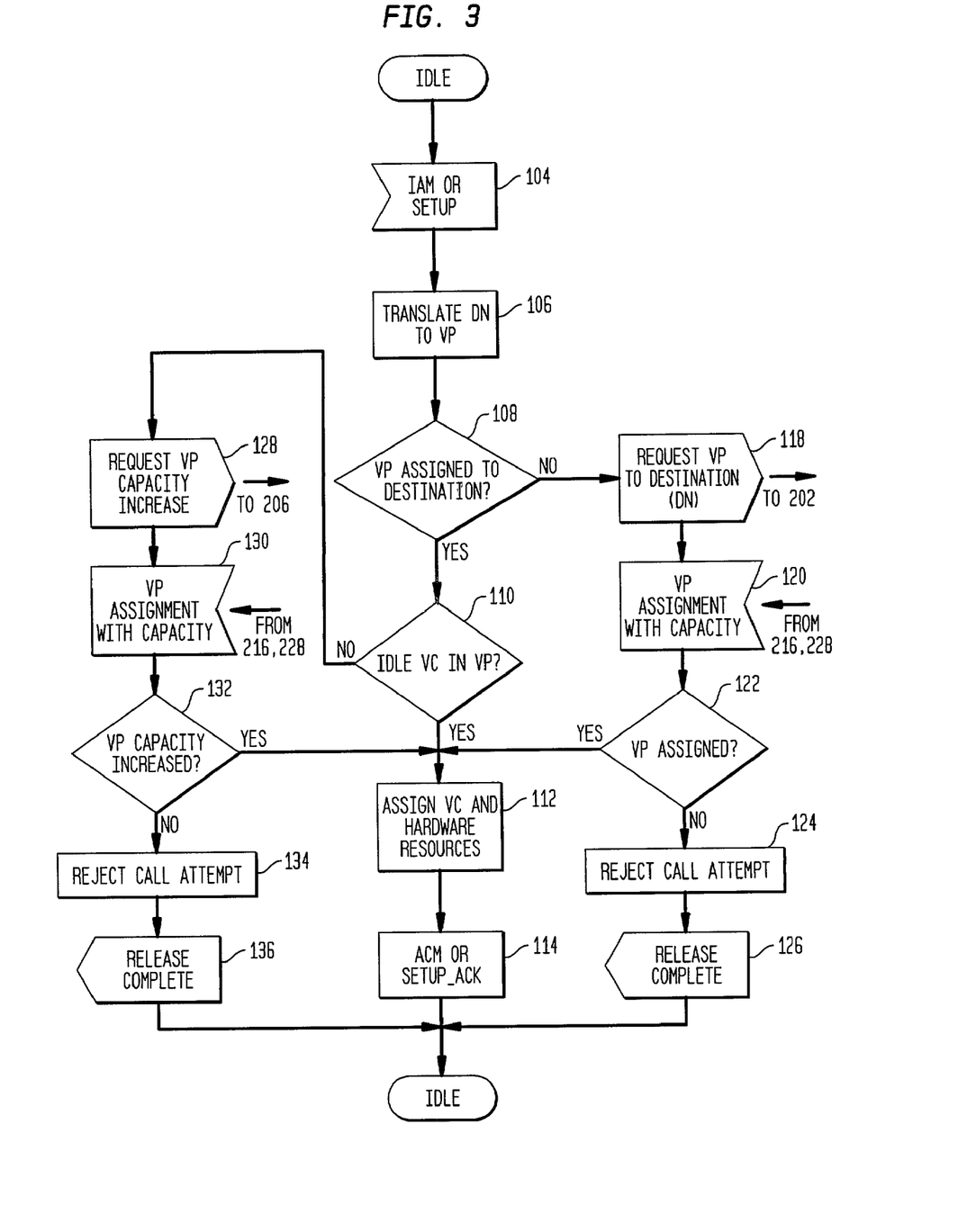
FIG. 3 is a flow diagram showing the process used by an ATM switch used in the telephone switching network of FIG. 2.

Referring now to FIG. 3, the processing at an exemplary one of the ATM switches 16 (FIG. 2) is shown. Thus, when a new call is placed (i.e., an initial address message (IAM) or SETUP is received by the ATM switch 16 (Step 104), the dialled number is translated to a virtual path (VP) from the ingress ATM switch to the egress ATM switch (Step 106). A check is made as to whether the VP has been assigned a destination (Step 108). If the translation is successful and a VP is assigned to the outgoing call, a check is made as to whether there is an idle VC in the VP (Step 110). If there is an idle VC in the assigned VP, a Virtual Channel Identifier (VCI) and hardware resources are assigned to the call (Step 112) and an Address Complete Message (ACM) or SETUP_ACK signal is returned to the preceding narrowband switch (Step 114).

If in Step 108, a VP had not been assigned to the call, a request would be made to a translation server 21 (FIG. 4) for a VP to the destination. Here, the translation server 21 (FIG. 4) is combined with the VP ring manager 20. The process performed by a translation server 21, in the VP ring manager 20, will be described in more detail in connection with FIG. 4. Suffice it to say here, however, that in response to such VP destination request, either a VP is assigned to the call (Step 118) along with a VP capacity (Step 120) by the translation server 21, or the VP assignment/change request is rejected by the translation server 21.

Next, a check is made as to whether a VP has been assigned, or rejected by, the translation server 21 (Step 122). If a VP was assigned to the call by the translation server 21, a VC and hardware resources are assigned to the call (Step 112) and an Address Complete Message (ACM) or SETUP_ACK signal is produced (Step 114). If, on the other hand, a VP was not assigned to the call as determined in Step 122, the call attempt is rejected (Step 124) and a RELEASE_COMPLETE message is sent to the preceding narrowband switch (Step 126).

Referring again to Step 110, if such a step determined that there was not an idle VC in the VP, a request for a VP increase would have been sent to the translation server 21 (Step 128). The request would be processed by the translation server 21 and the result returned to the ATM switch 16 (Step 130). Next, a check is made as to whether a VP has been increased by the translation server 21 (Step 132). If the VP capacity was increased, a VC and hardware resources are assigned to the call (Step 112) and an ACM or SETUP_ACK signal is returned to the narrowband (NB) switch 14 (Step 114). If, on the other hand, a VP capacity was not increased by the translation server 21, the call attempt is rejected (Step 134) and a RELEASE_COMPLETE indication is returned to the narrowband (NB) switch 14 (Step 136).

Figure 4:
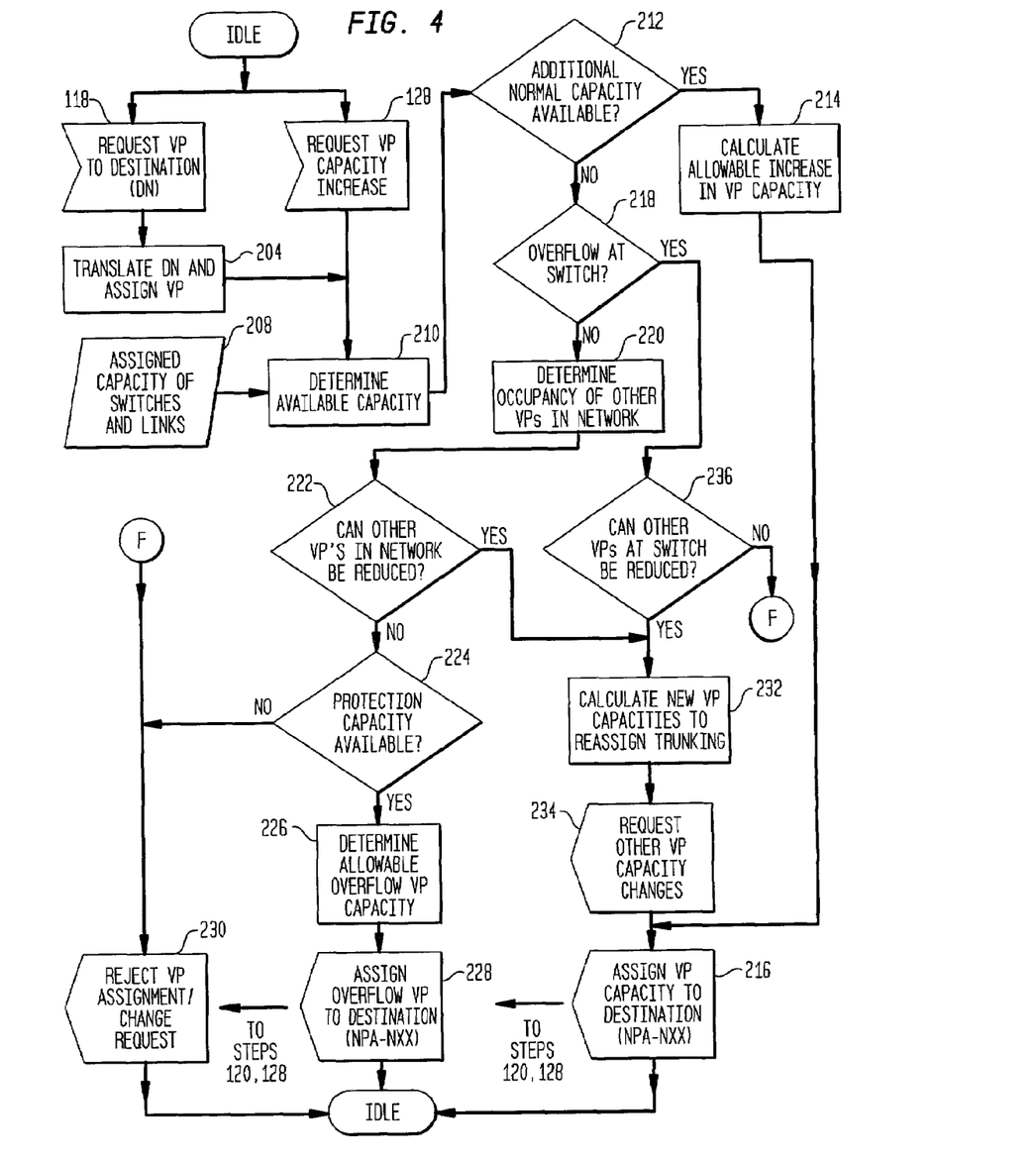
FIG. 4 is a flow diagram showing the process used by a translation server used in the telephone switching network of FIG. 2.

Referring now to FIG. 4, the process performed by the translation server 21 is shown. Thus, in response to a request for a VP designation (i.e, Step 118), the translation server 21 translates the called destination and assigns a VP to the call (Step 204). Also in response to a request for a VP capacity increase (Step 128), and the VP assignment performed in Step 204, a determination is made in Step 210 of the available capacity from a table in the translation server 21 of assigned ATM switch 16 and link capacities in Step 208.

Next, a check is made from the determined capacity whether additional "normal" capacity is available (Step 212). "Normal" capacity is SONET capacity that does not use protection bandwidth and will not be lost when a protection switch occurs. If the additional "normal" capacity is available, a calculation is made of allowable increase in VP capacity (Step 214). Next, the translation server 21 assigns the VP capacity to the destination, i.e., called number(NPA-NXX) (Step 216) and the translation server 21 returns to the idle condition (Step 217).

If, however, in Step 212, it was determined that additional normal capacity was not available, a check is made as to whether there is an overflow condition at the ATM switch 16

(Step 218). If no overflow condition exists, a determination is made of the occupancy of other VPs in the switching network 10 (Step 220). If other VPs in the network 10 can be reduced (Step 222), new VP capacities are calculated to reassign trunking to the call (Step 232). Next, a request is made to change (i.e., lower) the capacities of VPs not involved in the immediate call (Step 234). A higher VP capacity is then assigned to the destination (NPA-NXX) (Step 216), which is reported to the ATM switch 16 in steps 120 and 130, and the translation server 21 returns to the idle condition.

If, on the other hand, Step 222 determined that other VPs in the network cannot be reduced, a determination is made as to whether protection capacity is available (Step 224). (Protection capacity is spare capacity that is reserved for normal capacity when a protection switch occurs but which at other times can be used to carry additional, low priority traffic.) If such protection capability is available, a determination is made of allowable overflow VP capacity (Step 226). Once determined, an overflow VP is assigned to the destination (NPA-NXX) and reported to the ATM switch 16 in Steps 120 and 130 (Step 228). The translation server 21 then returns to the idle condition (Step 217). If, however, in Step 224 the translation server 21 determined that protection capability was not available, the translation server 21 rejects the VP assignment change request (Step 230) which is reported to the ATM switch 16 in Step 122 and returns to the idle condition (Step 217).

From the foregoing, the bandwidth-on-demand attribute of ATM has been exploited to provide dynamic trunking such that no trunk groups need to be defined ahead of time. Instead, only when a trunk group is required need a virtual path be established by the VP ring manager 20 and subsequently, only as trunks are needed to carry traffic would virtual channel connections be setup by the ATM switch 16. In this way, the capacity of a given traffic flow (between two specific end points, i.e. nodes A-D) can expand or contract according to demand and available bandwidth and not be limited by some pre-engineered number of trunks in a trunk group. A variant of using virtual paths if interworking is located in the narrowband switch is to map a number of trunks within the same trunk group to one Virtual Channel Connection (VCC) using either an ATM Adaptation Layer AAL1 many-to-one multiplexing method reported in ATM Forum Technical Committee af-vtoa-0089.000, "Voice and Telephony Over ATM—ATM Trunking Using AAL1 for Narrowband Services—Version 1.0") or using minicells mapped into the AAL2 format. These methods limit per-call processing to the edge nodes.

While FIG. 2 shows separate ADMs and ATM switches, the ADM function may be integrated into the ADM switch. For PSTN metropolitan tandem switching, it is ideal to collocate an ATM switch with each narrowband end office and extend the ATM ring through each location. However, a hubbing arrangement where more than one subtending end office homes onto an ATM switch may be more cost effective for small narrowband switches. Dual homing, where each subtending node connects two ATM switches on the ring, may be desirable in these cases. Typical transmission capacity requirements for a PSTN metropolitan or regional 4-fiber ring interconnecting end offices could be as shown in the TABLE in FIG. 8 (based on 64 kb/s pulse code modulation (PCM) and AAL1). A 15% trunk to line ratio is assumed at each narrowband switch, split equally between traffic origination or termination by switches subtending the same ring and traffic leaving the ring to the wider network. This equates to an 11.25% trunk to line ratio on the ring. The meshed traffic column assumes an even distribution round the ring, i.e., all nodes have an equal amount of traffic to all other nodes. Hubbed traffic represents a worst-case traffic distribution for a BLSR (single hub). While today's switches limit ATM rates to 600 Mb/s (STS-12c), TDM can be used to combine 4 or 16 of these into higher rates for transmission. However, higher ATM rates, e.g. STS-48c (2.5 Gb/s concatenation) can be expected in the future.

Figure 8:
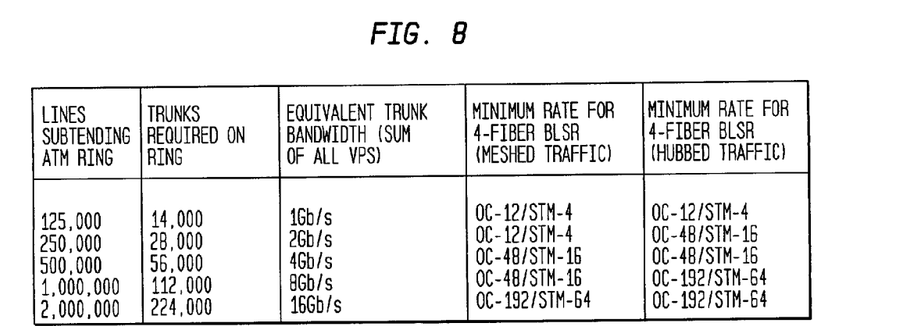
FIG. 8 is a TABLE showing typical transmission capacity requirements for a Public Service Telephone Network (PSTN) metropolitan or regional 4-fiber SONET ring interconnecting end offices based on 64 kb/s Pulse Code Modulation (PCM)
Figure 9:
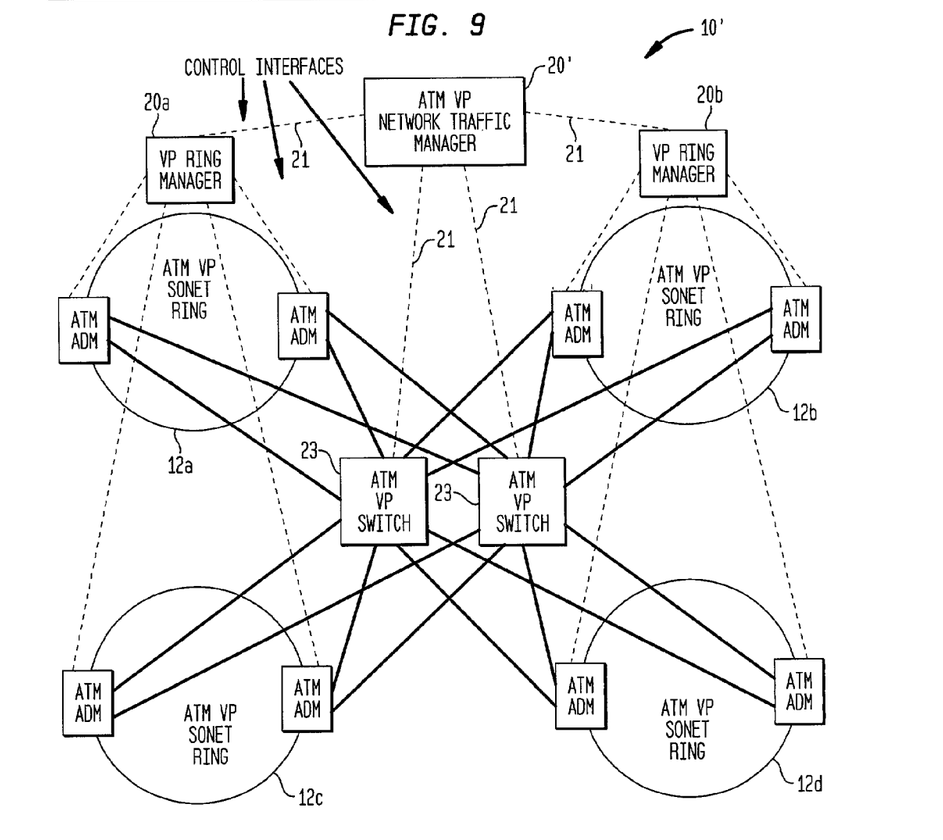
FIG. 9 is a diagram of a telephone switching network according to the invention wherein a plurality of he switching networks of FIG. 2 are interconnected.

From the TABLE in FIG. 8, it can be seen that a single ATM ring offers reasonable regional capacity. If required, larger networks may be realized by interconnecting regional rings through a virtual path mesh or hub, as shown in FIG. 9 where mated-pair hub switches 23 are used to interconnect rings 12a-12d. Here, VP ring managers 20a, 20b dynamically control trunk capacity for rings 12a, 12c and 12b, 12d, respectively, as indicated in FIG. 9. The entire network 10' trunking is dynamically controlled by network traffic manager 20' via control to and from the VP ring managers 20a, 20b and the switches 23, indicated by the dotted lines, indicated in FIG. 9.

Higher ring capacity may be achieved using optical (dense wavelength division) multiplexing. The use of voice compression to reduce bandwidth requirements also may be used to increase traffic capacity.

For private networks, the cost savings brought about by voice over ATM are realized by compressing voice and then consolidating it with other traffic types onto single pipes. Compression also has application in the public network especially on long distance circuits or when one carrier leases transmission capacity from other carriers. In addition, as the proportion of mobile and "desktop-compressed" (ITU-T Rec. G.723.1 and (G.729 Annex A) subscriber traffic increases, technical and economic factors would start to favor keeping the voice in compressed form as far as possible across the network, i.e. transcoding should take place as near to the POTS subscriber as possible and, in the case of mobile to mobile calls, the voice data should never be decompressed by the network.

Unlike the 64 kb/s TDM network, ATM can be exploited to efficiently transfer voice coding information at a lower rate than 64 kb/s. However, a simple AAL1 approach for transporting highly compressed voice might cause the total network delay to reach a level at which conversation is impacted. (To fill 47 octets at G.723.1's optional 5.3 kb/s would take 70 ms.) Network interworking overcomes this using the AAL2 cell format which packages many "mini-cells" into a cell sequence. To prevent delay accumulating in a service interworking arrangement (1 trunk per VCC), ATM cell generation would need to coincide with the framing of the compression scheme, e.g. for GSM, each cell could contain one 20 ms frame of 267 bits and for G.723.1 each cell could contain two 30 ms frames.

Another established means of reducing voice bandwidth is silence suppression. This has long been exploited in submarine cable systems and causes minimal conversation impairment, in modern, properly dimensioned, Digital Circuit Multiplexing Equipment (DCME). In an ATM network, the compression of voice into a variable bit rate traffic type by silence suppression frees up an amount of bandwidth equal to the peak cell rate minus the average cell rate.

Most echo cancelers inherently perform silence suppression since they incorporate a residual suppressor designed to remove the very small echo signals remaining after echo cancellation due to non-linear distortion in the echo path. Signals below about −36 dBmO are blocked but higher level signals are passed. If an echo canceler had ATM interfaces towards the network core, the residual suppressor would be the most ideal point to remove the silent intervals. Cells would simply not be generated and transmitted into the ATM network once the signal level drops below the residual suppressor threshold. This could be realized by means of a control signal connecting the level detector of the residual suppressor to the ATM cell generation and transmission controller. At the other end of the connection through the ATM network, missing cells must be replaced by comfort noise. The ATM traffic is now variable bit rate for which the peak cell rate bandwidth would be reserved. Reserved bandwidth not used at any instant could be made available to unspecified bit rate (UBR) traffic such as Internet traffic or, with care, could be useable for additional voice circuits as in DCME.

A key to efficient bandwidth utilization in an ATM backbone network is effective traffic management. For the ATM tandem switch this means managing the bandwidth of each VP as well as the total bandwidth allowed into the network. In addition, an ATM VP ring introduces a ring bandwidth maximum.

Since the VP replaces the trunk group in the ATM tandem switching network, this is the principal flow that must be established by a management system having as wide a view as the VP extends, which may be within a ring or across a network as shown in FIG. 8. As VCCs are setup and cleared, the actual bandwidth consumed will vary. One means to reduce the bandwidth reserved by a VP when it is consistently not required would be to have the switching element (or IWF) responsible for the VC assignment send periodic reports (e.g. every minute) to the system managing the VP bandwidth and allow for an updated peak bandwidth value to be set.

The compression ratio and silence suppression functions can also be managed, either by the ATM switch or preferably by the VP network traffic manager 20' and VP ring managers 20a, 20b (FIG. 9) because of their wider network view. This will allow the network to carry unusual overloads of traffic without blocking, albeit with some small transmission performance degradation compared with normal traffic loads.

Manually initiated network traffic management controls for mass calling or hard-to-reach destinations are still needed in an ATM-based tandem network. These controls would be required to prevent unusual calling patterns which are likely to end up as ineffective attempts, causing VP bandwidth assignments to grow unnecessarily which would possibly restrict other VPs from meeting their traffic demand.

Figure 10:
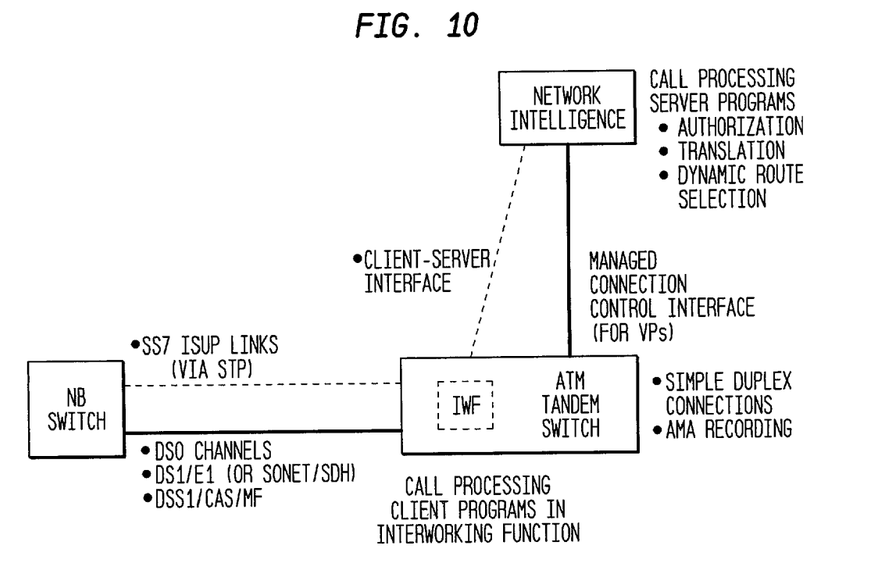
FIG. 10 is a diagram showing call processing functionality in an ATM switch according to the invention.
Figure 11:
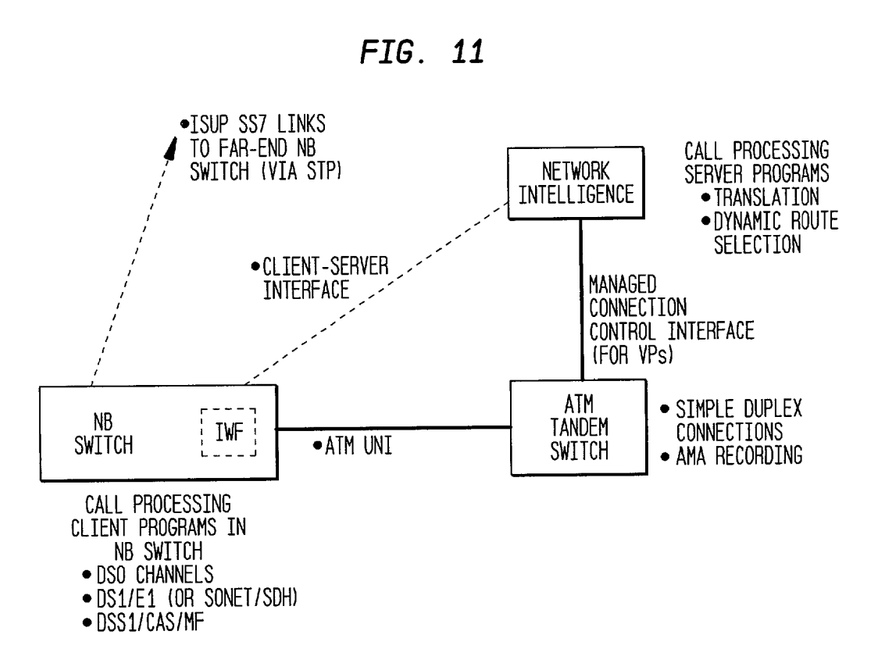
FIG. 11 is a diagram of call processing client functionality in a narrowband switch according to the invention.

Call processing for ATM tandem switching can be defined around a client-server model. By considering the IWF as a proxy client acting for the telephones which ultimately subtend it, the network service functionality can be split between the IWF and various servers providing address translation, authorization, etc. The ATM tandem switches then only have to provide simple, featureless connection control. This model is shown in FIGS. 10 and 11. On the face of it the client-server model would appear to align with network interworking more than service interworking since network interworking treats the ATM network as an on-demand transport network. However, by restricting access to service capabilities to the ingress IWF, service interworking can also follow this model. Client-server call processing for dynamic trunking can therefore apply to both network and service interworking. In addition, it can apply to both constant bit rate and variable bit rate voice such as that generated in the aforementioned echo canceller incorporating silence suppression using ATM cell transmission control.

Figure 5:
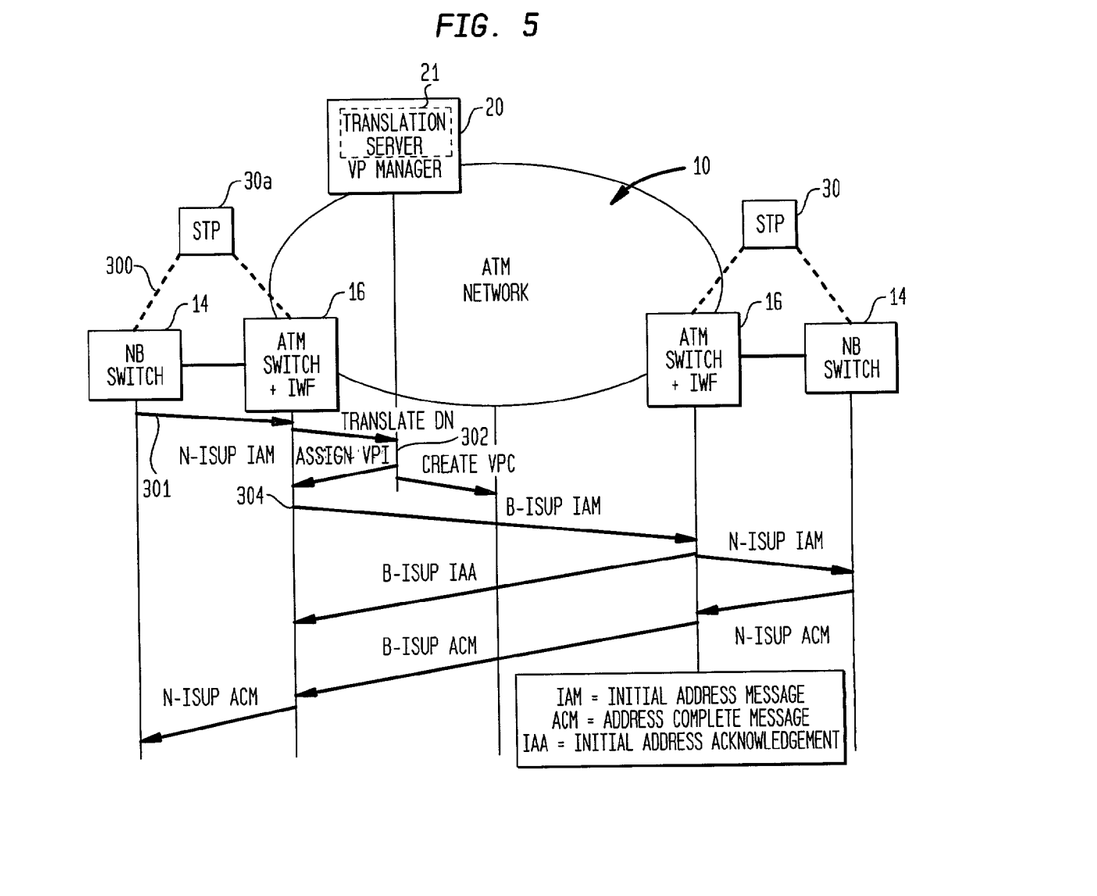
FIG. 5 is a diagram showing call setup with Service Interworking in an ATM Switch.
Figure 6:
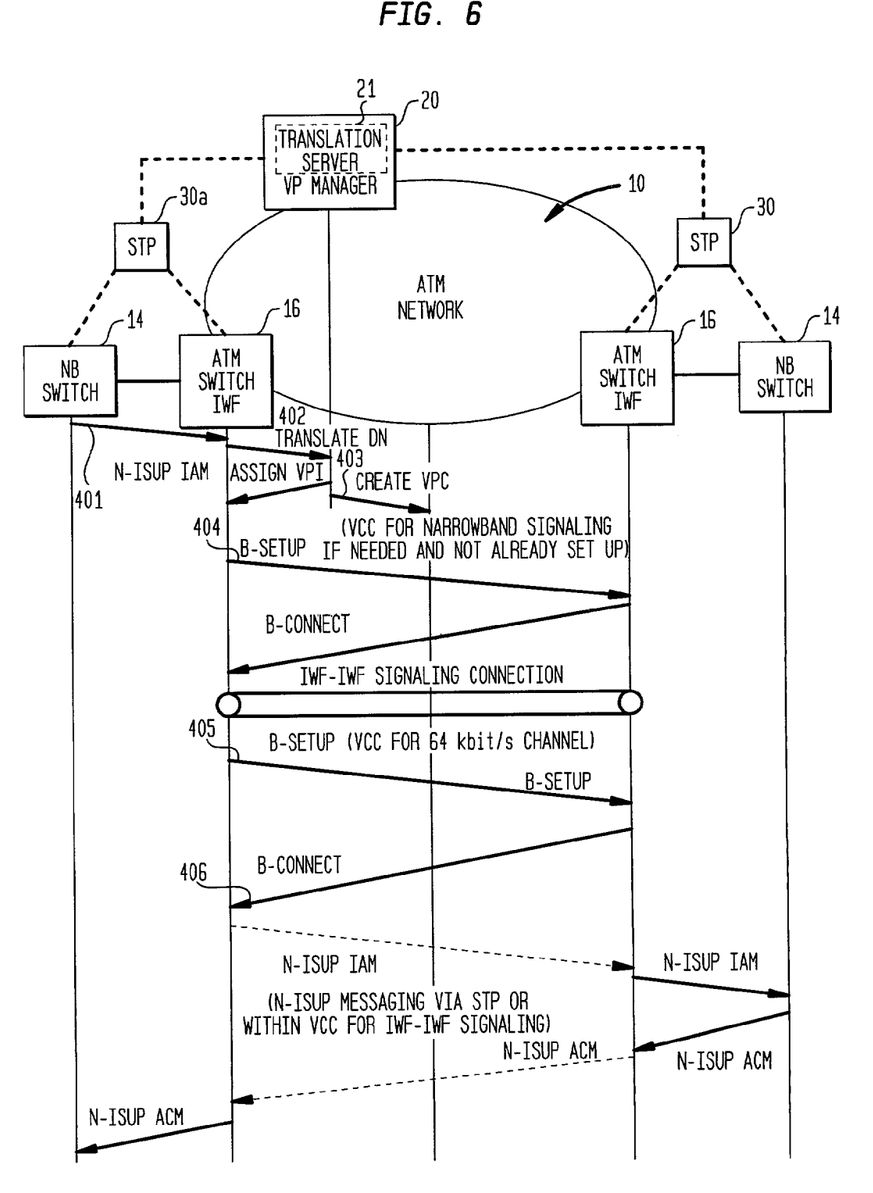
FIG. 6 is a diagram showing call setup with Network Interworking in an ATM Switch.
Figure 7:
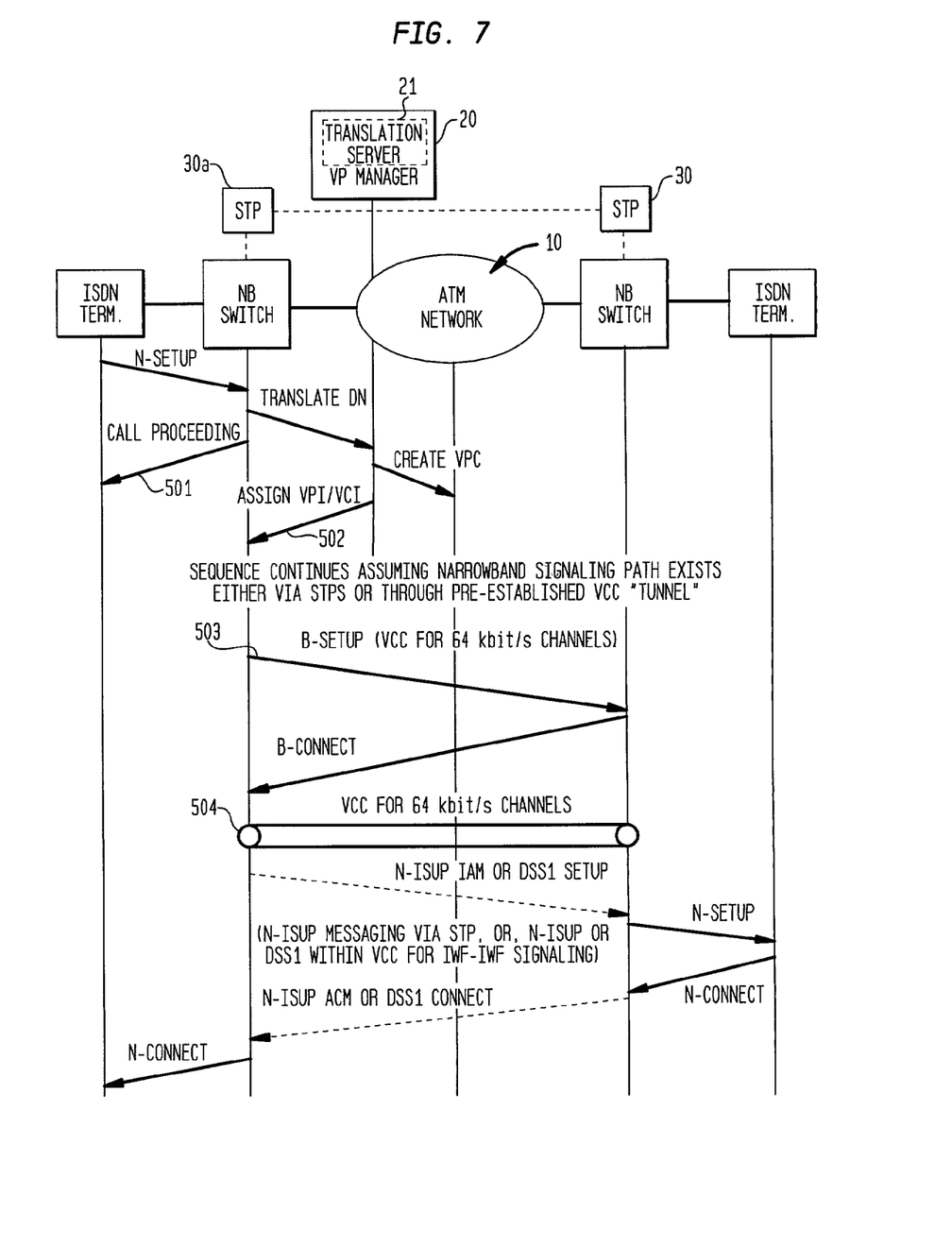
FIG. 7 is a diagram showing call setup with Network Interworking in Narrowband Switches.

FIGS. 5, 6, and 7, show three example call setup sequences consistent with the FIGS. 2-4. FIG. 5 shows service interworking in the ATM switch with Broadband ISDN User Part (ISUP) network SS7 signaling. The message flow for service interworking in the narrowband switch would be similar, with the ATM switch replaced by a narrowband switch (narrowband tandem in this case). FIGS. 6 and 7 show network interworking in the ATM switch and narrowband switch, respectively, derived from the ATM Forum Voice and Telephony Over ATM (VTOA) specification (i.e., reported in ATM Forum Technical Committee af-vtoa-0089.000, "Voice and Telephony Over ATM—ATM Trunking Using AAL1 for Narrowband Services—Version 1.0") but modified with SS7 ISUP messaging. In FIGS. 5 and 6, channel associated or bit-robbed signalling multi-frequency (MF) trunk signaling or Digital Subscriber Signalling 1 (DSS1) PBX signaling may be substituted for narrowband ISUP from Public Service Telephone Network (PSTN) switches, and Private Network Node Interface (PNNI) (the ATM Forum's Private Network Node Interface) network signaling could be interchanged with B-ISUP. FIG. 7 shows narrowband ISDN terminals (and PBXs) but this is functionally similar to Plain Old Telephone Service (POTS) for the purpose of this call setup flow.

Referring to FIG. 5, the ingress IWF receives call setup information from the subtending switch (Step 301). If translation data is local and the Virtual Path Identifier (VPI) has been pre-assigned, the IWF translates digits to the VPI; otherwise, it refers the call to a translation server (e.g. using an Intelligent Network protocol) (Step 302). If no VPI has been assigned to the destination corresponding to the translated digits, then the ring or VP ring manager translation server assigns one with a certain capacity and establishes the VPC across the network (Step 303). Following translation to a VPI, and provided that other flow controls are not exceeded, then a Virtual Channel Identifier (VCI) is assigned for the bearer channel, here for example 64 Kb, and a signaling message (B-ISUP or PNNI) is sent to the far-end ATM node to setup the bearer channel (Step 304).

Referring to FIG. 6, an ingress IWF receives call setup information from subtending switch (Step 401). If translation data is local and VPI has been pre-assigned, IWF translates the digits to a VPI; otherwise, it refers the call to the translation server (e.g. using an Intelligent Network protocol) (Step 402). If no VPI has been assigned to the destination corresponding to the translated digits, then the server assigns one with a certain capacity and establishes the VPC across the network (Step 403). In addition to setting up the VPC, a VCC may have to be established connecting the ingress and egress IWFs as a tunnel for narrowband signaling (not for quasi-associated SS7) (Step 404). Following translation to a VPI, and provided that other flow controls are not exceeded, then a VCI is assigned for the 64 Kb/s bearer channel and a signaling message (B-ISUP or PNNI) is sent to the far-end ATM node to setup the bearer channel (Step 405). A setup of the bearer channel is followed by transmission of the narrowband signaling information to the egress IWF over the separate signaling channel (Step 406).

Referring to FIG. 7, (wherein AAL2 or many-to-one multiplexing is used), a narrowband switch either translates the digits to a VPI/VCI (if translation data is local and a VCC has been pre-established) or else it refers the call to the translation server (Step 501). If no VPI has been assigned to the destination corresponding to the translated digits, then the server assigns one with a certain capacity and establishes the VPC across the network (Step 502). If translation is successful but there is no VCI with spare capacity to the destination then the narrowband switch must assign a new one. This involves selecting a trunk interface module with idle capacity and establishing a VCC for a group of trunks across the ATM network to the far-end narrowband switch (Step 503). An additional VCC is required for tunneling narrowband signaling when quasi-associated SS7 is not used (not shown in FIG.

7). The narrowband switch then selects an idle trunk within the VCC, sets up the 64 kb/s path across its fabric to the trunk interface module where the particular VCC cell stream is being constructed, and sends a narrowband signaling message to the corresponding narrowband switch at the far end of the VCC (Step 504).

Figure 12:
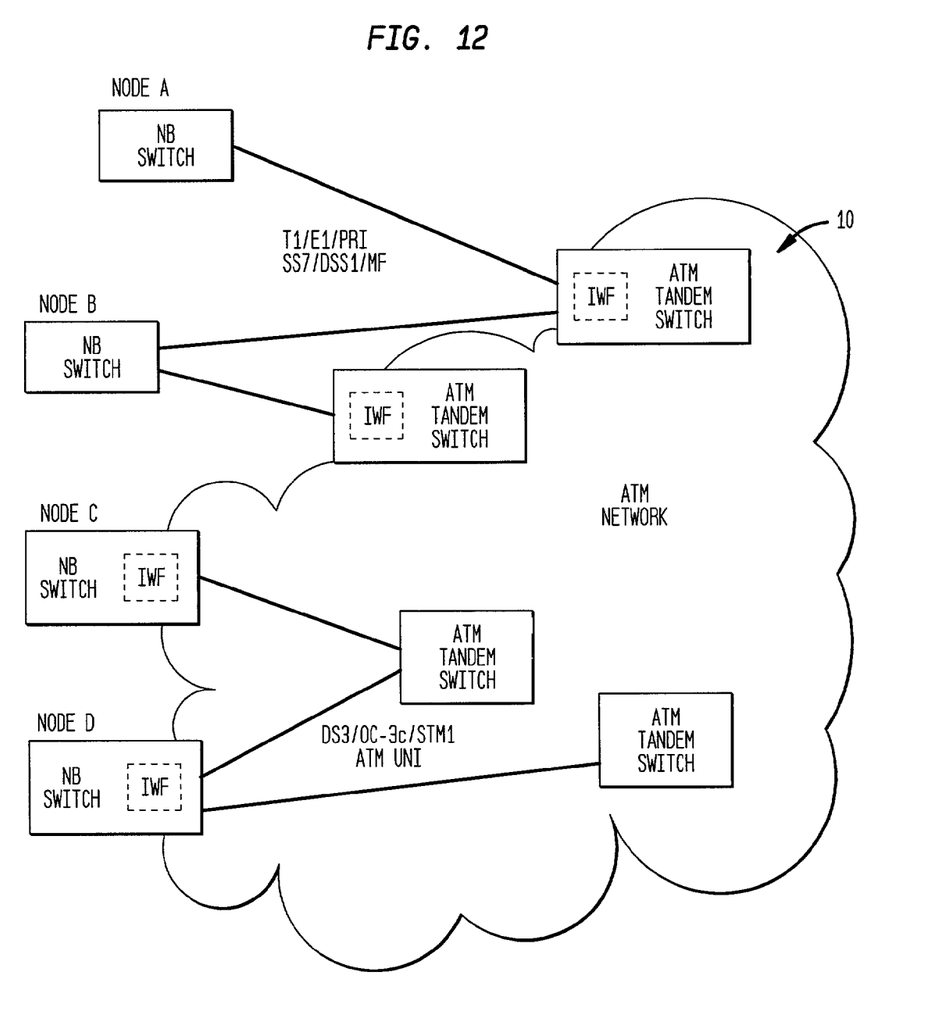
FIG. 12 is a diagram of an ATM tandem network according to the invention.

Referring to FIG. 12, an ATM network 10 is shown to illustrate that narrowband (NB) switches such as existing PSTN end-office switches, PBXs, operator systems, or intelligent peripherals, can each have their network trunking placed in one trunk group which connects to a "home" ATM switch with narrowband tandem functionality. Interworking between the narrowband and ATM networks can be placed at either end of the trunk group and can be integrated into either the ATM switch) Nodes A and B) or the narrowband nodes (Nodes C and D), for example. A variant of the single-homing arrangement is dual homing where a narrowband switch has its network split into two trunk groups homed on different ATM switches in order to give an additional level of service preservation in the event of a single node failure (illustrated by Nodes B and D).

Other embodiments are within the spirit and scope of the appended claims.

What is claimed is:

1. A method of allocating bandwidth in a network, comprising the steps of:
   providing a plurality of nodes interconnected through a network;
   dynamically allocating a first virtual path between at least two nodes of the plurality of nodes based on a request for a connection, wherein the first virtual path has an initial virtual circuit capacity;
   dynamically changing the initial virtual circuit capacity of the first virtual path based on a subsequent request for a connection in the network;
   determining if bandwidth is available from a second virtual path in the network; and
   reallocating bandwidth from the second virtual path to the first virtual path to alter virtual circuit capacity.

2. A telephone switching network, comprising:
   a plurality of switching nodes, each one of the nodes including an ATM ADM for coupling the node to the network;
   a network manager responsive to each one of the nodes to allocate traffic capacity of the network among the nodes dynamically in accordance with traffic requested at the plurality of nodes wherein each one of the ATM ADMs is coupled to a narrowband switch through an ATM switch, wherein the network manager allocates traffic capacity of the network among the nodes by allocating a first virtual path between at least two of the plurality of switching nodes based on a request for a connection and subsequently altering the capacity of the first virtual path by determining whether bandwidth is available from a second virtual path and reallocating bandwidth from the second virtual path to the first virtual path.

3. The network recited in claim 2, wherein the nodes are Interconnected through an ATM SONET.

4. The telephone switching network of claim 2, wherein the network manager dynamically allocates a trunk group between at least two of the plurality of switching nodes based on a dynamic demand to create the trunk group.

5. The telephone switching network of claim 2, wherein the network manager is configured to traffic capacity of the network among the nodes by dynamically allocating virtual circuits in the network among the nodes.

6. A method of allocating bandwidth in a network, comprising the steps of:
   providing a plurality of nodes interconnected through the network;
   dynamically allocating a first virtual path between at least two nodes of the plurality of nodes based on a request for a connection, wherein the first virtual path has an initial virtual circuit capacity; and
   dynamically changing the initial virtual circuit capacity of the first—virtual path based on a subsequent request for a connection in the network, further comprising prior to the step for dynamically allocating the first virtual path, the steps of:
   translating a dialed number to the first virtual path;
   checking whether the first virtual path has been assigned a destination; and
   if not assigned, assigning a destination to the first virtual path.

7. The method of claim 6, further comprising the steps of:
   determining if bandwidth is available from a second virtual path in the network; and
   reallocating bandwidth from the second virtual path to the first virtual path to alter virtual circuit capacity.

8. The method of claim 6, wherein the step of dynamically changing the initial virtual circuit capacity is based upon a determination that additional capacity is available in the network.

9. The method of claim 6, further comprising the steps of:
   coupling each one of the nodes to the network through an ATM ADM; and
   coupling one of the ATM ADMs to a narrowband switch through an ATM switch.

10. The method of claim 6, further comprising the step of dynamically changing virtual circuit capacity of the first virtual path by changing a compression ratio.

* * * * *